Patented Aug. 3, 1954

2,685,569

UNITED STATES PATENT OFFICE 2,685,569

SILICA-MAGNESIA CATALYST AND METHOD OF PREPARATION

Finley C. Nicholson, Wyoming, and Charles P. Wilson, Jr., Cincinnati, Ohio, assignors to The Davison Chemical Corporation, Baltimore, Md., a corporation of Maryland No Drawing. Application June 27, 1951, Serial No. 233,944

21 Claims. (Cl. 252—452)

This invention relates to a novel catalyst for the treatment of petroleum oils and more particularly to an improved silica-magnesia catalyst and a method for its manufacture.

Synthetic porous solids comprising silica and one or more metallic oxides have been used extensively in recent years for the treatment, and particularly cracking, of petroleum oils because of their catalytic properties. In the cracking of these mineral oils the catalytic properties depend upon the particular metallic oxide incorporated with the silica and are strongly influenced by the method of preparation and treatment of the catalysts during their manufacture.

In the cracking operation the mineral oils are passed in contact with the catalyst at elevated temperatures. One of the products of the cracking reaction is carbon which is deposited upon the surfaces of the catalyst and impairs the activity of the catalyst. It is necessary to remove the carbon from the surface of a catalyst to reactivate it before the catalyst can be effectively used again in a cracking reaction. Ordinarily the removal of carbon is accomplished by combustion of the carbon from the surface of the catalyst. It will be appreciated that the ability to burn the carbon from the catalyst and other physical properties of the catalyst such as hardness, strength, and attrition resistance, are of extreme importance in the evaluation of a catalyst.

A preferred catalyst for the cracking of petroleum oils for the production of gasoline is one comprising silica and magnesia because of the increased yield of cracked products in the gasoline boiling range. In addition, silica-magnesia catalysts generally have higher steam and thermal stabilities than other common types of catalysts, such as those prepared from silica and alumina.

Many methods have been developed for the introduction of magnesia into silica to form a silica-magnesia catalyst. For example, a silica gel may be impregnated with a magnesium salt which is then precipitated in the gel by treatment of the gel with ammonia. In another method, a silica hydrogel is thoroughly mulled with magnesia or magnesium hydroxide. In a preferred method, a slurry of magnesia is added to a silica hydrosol which is allowed to gel and then is washed, dried, and activated to prepare the final catalyst. All of the methods heretofore available allow relatively little control of the pore size and other characteristics of the catalyst primarily because of the fixed hydration of the magnesium compounds employed.

An important disadvantage of the silica-magnesia catalysts heretofore available has been the difficulty with which carbon is burned from the surface of the catalysts during their reactivation. In the reactivation by ignition of the catalysts prepared according to the methods of the prior art, the carbon is incompletely removed from the catalysts and builds up to a concentration which seriously impairs the activity of the catalyst.

It is an object of this invention to provide a novel silica-magnesia catalyst of superior pore structure and catalytic properties.

Another object of this invention is to provide a novel silica-magnesia catalyst in which the catalytic properties may be controlled within wide limits during its manufacture.

A further object of this invention is the provision of a method of manufacturing silica-magnesia catalyst in which a colloidal magnesia is reacted with colloidal silica to provide a novel catalyst.

A still further object of this invention is to provide a method of manufacture of a silica-magnesia catalyst by the reaction of a complex colloidal magnesium compound with a colloidal silica in which the pore size and catalytic characteristics of the catalyst may be controlled within wide limits by the degree of hydration of the colloidal magnesium compound.

A further object of this invention is to provide a method in which a partially neutralized sodium silicate is reacted with a hydrated colloidal magnesium oxy-compound to form a silica-magnesia catalyst.

A further object of this invention is to provide a method of manufacture of a silica-magnesia catalyst facilitating the complete removal of zeolitic and soluble sodium from the catalyst with a minimum loss of magnesium.

It is also an object of this invention to provide a novel silica-magnesia catalyst having improved carbon burnability properties facilitating reactivation of the catalyst.

Another object of this invention is to provide a method for manufacturing a novel silica-magnesia catalyst requiring a reduced acid consumption as compared with methods heretofore available.

With these and other objects in view, as will become apparent in the following detailed description, this invention resides in the reaction of a colloidal magnesium oxy-salt with colloidal sodium silicate to prepare a silica-magnesia gel suitable for the manufacture of novel silica-magnesia catalysts.

In preparing a catalyst according to a preferred form of this invention a concentrated solution of a magnesium salt, for example, a solution of magnesium chloride having a specific gravity above 1.16 and preferably between 1.18 and 1.22, is mixed with magnesia to form a magnesium oxychloride. The mixture of the two magnesium compounds forms a colloidal or gelatinous mass which on continued standing or agitation thickens to a solid which will not flow from a vessel. In a preferred embodiment, the mixture of the magnesia and magnesium chloride solution is allowed to react to a stage short of solidification and additional water or dilute magnesium chloride solution is added to control the hydration and swelling of the resultant product. The resulting complex magnesium oxychloride is then mixed with a sodium silicate solution suspended on a silica gel which has been formed by neutralization of 45–85% of the sodium silicate, and the product is washed substantially free of sodium, dried and activated to form a catalyst.

Magnesia suitable for use in this invention may be obtained from many sources, such as magnesite, dolomite, and magnesium salts derived from sea water. In general, the swelling properties of the magnesia, when mixed with solutions of magnesium salts, will depend on the origin (natural or synthetic), physical and chemical composition of the raw material, as well as the physical state and degree of purity of the calcined magnesia. In the case of the synthetics, the chief sources include the hydroxide, and the basic and normal carbonates. In addition to possible variations in the source of the magnesia, the magnesia from any one source may vary in its characteristics. For example, magnesium oxides prepared by mildly heating certain magnesium carbonates have particularly high swelling properties and may be employed in the reaction with magnesium chloride to form the complex oxychloride. Generally, the amount of swelling on mixing with a magnesium salt decreases as the severity of the heating of the carbonate to produce the magnesia is increased. Mixtures of magnesias derived from different sources and possessing different swelling properties may also be used.

The magnesium salt solution with which the calcined magnesia is mixed may be of any soluble magnesium salt. Examples of compounds suitable for use in this invention in addition to magnesium chloride are magnesium sulphate, magnesium nitrate, magnesium iodide, magnesium bromide, magnesium borate, magnesium acetate, magnesium formate, etc. Magnesium chloride and magnesium sulphate are preferred because of their low cost and availability. In the description of this invention, reference will be made to the reaction of magnesium chloride with calcined magnesia. It will be understood that the invention is not limited to the use of magnesium chloride, but includes the reaction of other soluble magnesium salts with magnesia to form complex magnesium oxy-compounds.

For best control of the swelling and hydration of the magnesium oxychloride care should be taken in the mixing of the calcined magnesia with the magnesium chloride solution to avoid the addition of excessive water too early in the mixing operation. Best control of the swelling and hydration of the magnesium oxy-compound can be obtained by mixing the calcined magnesia with a concentrated solution slowly with continuous mixing until the desired swelling has been obtained and thereafter adding water or a dilute solution of the magnesium salt to the resultant gel. If excessive water is added too early in the mixing operation the gelatinous mass begins to break down and free water separates. Further control of the amount of swelling of the gel is obtained by control of the temperature at which the reaction is performed either by adding heat from an external source or by cooling. In general, high temperatures will result in increased swelling. The reaction product continues to gel for an extended period following the mixing of the reactants and further control of the gelation is obtained by varying the aging period.

The ratio of magnesia to magnesium chloride which may be used varies from an excess of magnesia to an excess of the magnesium salt and may range from the ratio of .23 to 1 to a ratio of as high as 5 to 1. A limited quantity of free magnesium salt may be present in the mixture as long as it is supported in a gelatinous, complex magnesium oxy-compound.

The process of this invention can also be employed utilizing a previously prepared solid magnesium oxychloride, for instance, a magnesium oxychloride prepared according to the method described in United States Letters Patent No. 2,163,819 of Fritz Wienert issued June 27, 1939 in which dry magnesium chloride hexahydrate is heated with powdered magnesia. The solid, previously prepared, oxychloride is dissolved by heating with water or a magnesium chloride solution to form a complex magnesium compound for reaction with sodium silicate.

The sodium silicate may vary in silica to soda ratio from 3.4 to 1 to 0.5 to 1. In the preferred form of the invention the sodium silicate is partially neutralized with acid to form a hydrogel in which the remaining unneutralized sodium silicate is supported. Ordinarily it is preferred that about 45–85% of the $Na_2O$ in the sodium silicate be neutralized prior to mixing with the colloidal magnesium oxy-compound. The extent of neutralization with acid will depend upon the soda to silica ratio of the sodium silicate and the magnesia to magnesium chloride ratio in the magnesium oxychloride. In general, the magnesium salt should be present in the oxy-compound in a form available for reaction with the $Na_2O$ in the sodium silicate. Ordinarily, it is preferred to neutralize the sodium silicate as little as possible with acid prior to mixing with the magnesium oxy-compound in order to reduce the acid requirements of the process. While the reaction of the magnesium oxychloride with sodium silicate supported on a hydrogel allows the preparation of a catalyst product with superior carbon burning characteristics, an improved catalyst can be prepared according to this invention by the neutralization of a sodium silicate solution with a colloidal magnesium oxy-compound. The flexibility in degree of hydration of the colloidal magnesium oxy-compound also allows improved catalysts to be prepared according to this invention by mulling the colloidal magnesium oxy-compound directly with a fully neutralized silica hydrogel.

Throughout the description of this invention reference is made to the formation of a gel, both of magnesium oxy-compound and of silica. The gel may be either in the form of a homogeneous hydrogel obtained by mixing the reactants and allowing the mixture to stand quietly during gelation or in the form of a slurry of finely divided gel particles obtained by stirring or agitating the reactants during gelation.

The colloidal complex magnesium oxychloride and sodium silicate are mixed to form a gelatinous magnesium silicate. If a gelatinous magnesium oxychloride is mixed with a silica hydrogel containing substantial quantities of unneutralized sodium silicate, the chloride impurity is removed from the system through reaction with the unneutralized sodium silicate to produce water soluble sodium chloride which may be washed from the resultant gel. The control of the pore structure and surface characteristics made possible by control of the hydration and swelling of the magnesium oxy-compound permits a higher concentration of magnesia in the catalyst. In general, the complex gelatinous oxychloride is mixed with sodium silicate in proportions to yield a series of silica catalysts ranging in magnesia content to as high as 60% by weight.

The silica-magnesia gel is washed with water to remove the soluble sodium salts therefrom and then may be base exchanged by washing with a solution of magnesium chloride containing an excess of magnesium chloride to release the zeolitically held sodium. The base exchanged gel is then washed with hot water to remove the excess magnesium chloride on the gel. The rinse water from the base exchange procedure and from the final hot water wash contain magnesium chloride and may be employed in the preparation of the magnesium chloride solutions used in the preparation of the complex magnesium oxychloride. By proper regulation of the quantity of base exchange liquor and final wash water, all of the magnesium in the wash and base exchange liquors are returned to the system and losses of magnesium are reduced to a minimum. Moreover, since the magnesium solution is returned to the system, freedom in the selection of the concentration, temperature, and pH of the magnesium chloride wash water, as well as the amount of washing solution, is made possible without incurring excessive loss of magnesium. In this manner, a controlled degree of leaching may be employed to improve and control the pore structure, density, and activity of the final product.

The washed catalyst may be dried, activated, and ground to the desired particle size by conventional procedures known in the art. In some instances, it will be desirable to spray dry the gelatinous product of mixing the magnesium oxy-compound and colloidal sodium silicate, in which event the spray drying may be accomplished either before or after the washing operation.

While all of the description and following examples of specific preparation have been confined to silica-magnesia compounds, other constituents acting as activators, promotors, or stabilizers may be added to the catalyst of this invention. For example, alumina may be introduced into the product by using soluble aluminum salts as a base exchange agent in the washing of the gel.

The following examples illustrate variations of the process of this invention which may be employed to prepare the novel silica-magnesia catalyst of this invention. It will be understood that the following examples are only for purposes of illustration and in no manner limit the scope of this invention.

EXAMPLE 1

488 grams of 40% sulphuric acid solution at 130° F. were added to 13,962 grams of sodium silicate solutions composed of $SiO_2$ 3.76%, $H_2O$ 95.11% at 82° F., to produce a silica hydrogel composed of $SiO_2$ 3.62%, $Na_2SO_4$ 1.96%, $Na_2O$ 0.24%, $H_2O$ 94.18%. 14,450 grams of this hydrogel was mixed with a magnesium oxychloride hydrogel prepared according to the following paragraph. The reaction product was agitated during gelation to form a slurry of gel.

176 grams of calcined magnesium oxide composed of 161 grams bone dry MgO and 15 grams water were added to 300 cc. of a previously prepared solution of magnesium chloride having a specific gravity of 1.19 at 60° containing 21.1% $MgCl_2$ at a temperature of 78° F.

A mortar and pestle was used for mixing in order to make sure there is no lumping of the MgO. After mixing for 36 minutes, during which time the mass thickened to a consistency of soft putty, 25 grams of water were added and worked into the gelatinous paste. Additional water was worked into the plastic mass at 2 to 4 minute intervals until 2,000 cc. had been added at the end of 93 minutes. The quantity of water used in each dose was increased from the initial 25 cc. up to 100 cc. quantities at the end of 19 minutes, after which approximately 100 cc. quantities were used until the total had been added. Agitation was continued during the gelation to produce a slurry of the magnesium oxychloride gel.

The 14,450 grams of silica hydrogel were added slowly to the 2,533 grams of magnesia hydrogel with continued stirring, the mortar and pestle again being used as a mixing device.

The mixed hydrogel slurry was filtered by means of Büchner funnels, the cake broken up by passing through a 4 mesh screen, and air dried to a water content of approximately 30%.

10,633 grams of filter cake of 91.0% ignition loss at 1500° F., and 6,350 grams of filtrate were recovered in filtering the mixed hydrogel slurry. The filtrate was found to contain 6.9 grams of $MgCl_2$ and 0.89 gram of $SiO_2$.

The dried filter cake was ground and screened through a 40 mesh screen, then washed six times (15 minutes shaking, 15 minutes settling), with hot water at 120° F. using 6,000 cc. of distilled water for each wash. The combined wash water was found to contain a total of 35.1 grams of $MgCl_2$ and a negative quantity of $SiO_2$. Small samples washed exhaustively with water showed that the sodium oxide content would not be reduced below a level of 0.86% (bone dry basis).

The water-washed gel was agitated with 300 cc. of a 10% $MgCl_2$ solution for 15 minutes at 130° F., separated by filtration, then given a second wash for 15 minutes with the 10% $MgCl_2$ solution followed by filtration.

The gel was finally washed 5 times by reslurrying with 300 cc. quantities of hot water at 130 F. The gel was then air dried and submitted for analytical and catalytic testing. The analysis on a dry basis was:

| | Per cent |
|---|---|
| MgO | 25.74 |
| $Na_2O$ | 0.067 |
| $So_4$ | 0.002 |
| Cl | 0.23 |

Following the hot water wash and prior to base exchanging with $MgCl_2$ solution, the MgO content was 25.05%, and the $Na_2O$ 0.86%.

EXAMPLE 2

Catalyst was prepared as described in Example 1 with the exception that the silica and the complex magnesium oxychloride were each allowed to set to a homogeneous hydrogel.

EXAMPLE 3

The gelatinous magnesium silicate of this example is particularly adapted for spray drying procedures. In preparing the alkaline silica hydrogel a dilute sodium silicate solution of 1.124 S. G. and a dilute mineral acid containing 7.0% ($H_2SO_4$) were used.

25.8 lbs. of a dilute solution containing 7.0% $H_2SO_4$ were added to a vessel containing 74.8 lbs. of dilute sodium silicate at 82° F. of 1.124 S. G. at 60° and a $SiO_2$ to $Na_2O$ ratio of 3.3 to 1, and containing 10.2% $SiO_2$ and 3.1% $Na_2O$. After the gelation of the mixture of silicate and acid had proceeded to a stage where the fluidity was such as to allow pouring, the silica hydrogel was mixed with the magnesia oxychloride hydrogel previously prepared as described below. The composition of the silica hydrogel was $SiO_2$ 7.66%, $MgSO_4$ 2.61%, $Na_2O$ 1.17%, $H_2SO_4$ 89.16%.

2.3 lbs. of calcined magnesium oxide (containing 8.5% moisture) were added to 8.5 lbs. of a solution of magnesium chloride (1.19 S. G.) containing 21.1% $MgCl_2$ by weight. The reaction was allowed to proceed at a temperature of 78° F., however, heat may be supplied if desired to increase the speed of the hydration and gelation. Stirring was provided to make sure all the magnesium oxide was held in suspension in the $MgCl_2$ solution. After 45 minutes, an appreciable thickening of the mass occurred. After the contents of the vessel reached the desired state of fluidity (such as to allow flow by gravity), the magnesia hydrogel was mixed with the previously prepared silica hydrogel. In the present example, no extraneous water was added to the thickened mass of magnesium oxychloride hydrogel. In this example, the silica hydrogel was added to the magnesium hydrogel, however, in practice, the two hydrogels may be mixed continuously by proportioning through a suitable mixing device.

EXAMPLE 4

The catalyst of this example was prepared as for Example 1 with the exception that the magnesia and magnesium chloride solutions were stirred for one hour and then mixed with the colloidal sodium silicate.

EXAMPLE 5

205 grams of 95% sulphuric acid dissolved in 283 grams of water were added to 1900 grams of 40 Bé. sodium silicate dissolved in 12 liters of water to form a slurry of silica hydrogel. 161 grams of calcined magnesium oxide were added to a solution of magnesium chloride having a specific gravity of 1.19 at 60° and containing 161 grams of magnesium chloride hexahydrate with agitation to form a slurry of magnesium oxychloride gel. The two gels were mixed with continuous stirring and the resultant product washed with water, base exchanged with 10% magnesium chloride solution, again washed with water, and hot aged at 90° C. over night.

EXAMPLE 6

116 grams of calcined magnesia were mixed with 530 grams of magnesium chloride hexahydrate dissolved in 2 liters of water. The resultant colloidal magnesium oxychloride was quickly added to a solution prepared by mixing 1900 grams of 40 Bé. of sodium silicate solution to 12 liters of water. The mixture was allowed to set and was washed, base exchanged, and hot aged as described for Example 5.

EXAMPLE 7

116 grams of calcined magnesia were added to 530 grams of magnesium chloride hexahydrate dissolved in 2 liters of water with continuous stirring to form a slurry of magnesium oxychloride. The resultant slurry was added with agitation to a solution formed by adding 12 liters of water to 1900 grams of 40 Bé. sodium silicate solution. The resultant gel was washed, base exchanged, and hot aged as described for Example 5.

EXAMPLE 8

161 grams of calcined magnesia were added with agitation to 195 grams of $MgSO_4 \cdot 7H_2O$ dissolved in 260 grams of water to form a slurry of colloidal magnesium oxysulphate. 205 grams of 95% sulphuric acid dissolved in 283 grams of water were added with agitation to 1900 grams of 40 Bé. sodium silicate dissolved in 12 liters of water to form a slurry of silica hydrogel. The two slurries were mixed with continual stirring and the resultant product washed, and base exchanged with 10% magnesium sulphate.

Samples prepared by all of the above examples with the exception of Example 3 were pelleted and then heated in a muffle furnace for 3 hours at 450° F. and then 3 hours at 1050° F. Each of the different catalysts was divided into two samples, one of which was heated at 1350° F. for a period of 3 hours to test for thermal stability, the other sample was heated for 24 hours at 1250° F. in the presence of steam at 60 lbs. gauge to test for steam stability. The thus treated catalysts were tested for activity by passing a East Texas gas oil boiling in the range of 400 to 700° F. over 200 cc. of the pelleted catalyst at a volumetric space velocity of 0.6 v./hr./v. The catalyst was supported in a 1⅜″ I. D. tube supported in a furnace block mounted at 850° F. The cracked liquid product was cooled in a flask and the gas from the cracking operation was collected over water in a positive displacement holder. The cracking period was of 2 hours duration. The liquid product is distilled to a cut point equivalent to 400° F. ASTM in a Vigreau distillation column. The catalyst activity is defined by the volume percent of distillate based on the liquid product charged to the distillation. The activities of the catalysts are set forth in Table I in which the sample numbers correspond to the examples described above.

*Table I*

| Sample No. | Hot Aged at 90° C. | Percent MgO (db) | Thermal Activity | Steam Activity |
|---|---|---|---|---|
| 1 | No | 25.74 | 50.9 | 30.0 |
| 2 | No | 22.46 | 29.2 | 19.1 |
| 3 | No |  | 50.6 | 14.5 |
| 4 | No |  | 46.6 | 34.0-31.0 |
| 5 | Yes |  | 54.8-49.5 | 39.3-39.3 |
| 6 | Yes | 27.75 | 46.3-48.9 | 36.2-33.4 |
| 7 | Yes | 28.35 | 50.7 | 36.9 |
| 8 | No |  |  |  |

It will be appreciated from the above data obtained on catalysts prepared by a few of the many possible embodiments of the process of this invention, that wide variations and an extreme flexibility in the properties of the catalyst are possible. It has further been found that the "thermal" activity and "steam" activity can be varied independently. By control of the degree of swelling during the preparation of the complex magnesium oxy-compound, a catalyst of controlled pore structure and improved carbon burnability over those heretofore available is provided. Moreover, the control of the pore structure of the catalyst made possible by this invention permits incorporation of higher concentrations of magnesia in the catalyst than were heretofore possible by known processes.

The incorporation of magnesia directly in silica gels in the preparation of silica-magnesia catalysts has been the cause of considerable difficulty. The novel composition and method of this invention in which a colloidal complex magnesium oxy-compound is mixed with sodium silicate, preferably supported on a hydrogel, provides an efficient, easy method of mixing the silica and magnesia to form a gelatinous magnesium silicate.

While this invention has been described in detail with respect to a particular modification of the invention, it is to be understood that the concept of this invention is not limited to those details, but is determined by the scope of the appended claims.

We claim:

1. In a method of preparing a silica-magnesia catalyst in which a silica-magnesia gel is formed, washed, dried, and activated, the improvement comprising the step of reacting a sodium silicate with a colloidal complex magnesium oxy-salt to form the silica-magnesia gel.

2. In a method of preparing a silica-magnesia catalyst in which a silica-magnesia gel is formed, washed, dried and activated, the improvement comprising the step of admixing a colloidal silicic acid with a colloidal complex magnesium oxy-salt to form the silica-magnesia gel.

3. In a method of preparing a silica-magnesia catalyst in which a silica-magnesia gel is formed, washed, dried and activated, the improvement comprising the step of reacting a sodium silicate with a colloidal complex magnesium oxy-salt in proportions to form a gel containing up to approximately 60% magnesia on a dry basis.

4. In a method of preparing a silica-magnesia catalyst in which a silica-magnesia gel is formed, washed, dried and activated, the improvement comprising the step of reacting a sodium silicate with a colloidal complex magnesium oxy-salt in proportions to form a gel containing about 20 to 60% magnesia on a dry basis.

5. In a method of preparing a silica-magnesia catalyst in which a silica-magnesia gel is formed, washed, dried and activated, the improvement comprising the step of reacting a sodium silicate with a colloidal complex magnesium oxy-salt, said colloidal magnesium oxy-salt having a molar magnesia to magnesium salt ratio ranging from approximately 0.23 to 1 up to approximately 5 to 1.

6. In a method of preparing a silica-magnesia catalyst in which a silica-magnesia gel is formed, washed, dried and activated, the improvement comprising the step of reacting a colloidal magnesium oxy-salt with a sodium silicate in which about 45 to 85% of the $Na_2O$ is neutralized to form a silica hydrogel on which the unneutralized sodium silicate is dispersed.

7. In a method of preparing a silica-magnesia catalyst in which a silica-magnesia gel is washed, dried and activated, the improvement comprising the step of reacting a colloidal magnesium oxy-salt with a sodium silicate having a molar silica to soda ratio of approximately .5 to 1 to 3.4 to 1.

8. A method of preparing a silica-magnesia catalyst comprising reacting a colloidal magnesium oxy-salt with a sodium silicate to form a silica-magnesia gel, washing the reaction product to remove sodium therefrom, and drying and activating the washed gel to form a silica-magnesia catalyst.

9. A method of preparing a silica-magnesia catalyst comprising reacting a colloidal magnesium oxy-salt with a sodium silicate dispersed on a silica hydrogel to form a silica magnesia gel, washing the reaction product to remove sodium therefrom, and drying and activating the washed gel to form a silica-magnesia catalyst.

10. A method of manufacturing a silica-magnesia catalyst comprising reacting a colloidal complex magnesium oxy-salt with a sodium silicate to form a silica-magnesia gel, washing the gel with water to remove soluble sodium therefrom, contacting the gelatinous magnesium silicate with a solution of a magnesium salt to remove zeolitically held sodium from the gel by base exchange, and drying and activating the substantially sodium free product.

11. In a method of preparing a silica-magnesia catalyst in which a silica-magnesia gel is formed, washed, dried and activated, the improvement comprising the step of reacting a sodium silicate, in which about 45 to 85% of the $Na_2O$ is neutralized to form a silica hydrogel on which the unneutralized sodium silicate is dispersed, with a colloidal magnesium oxy-salt selected from the group consisting of magnesium oxychloride and magnesium oxysulphate to form the silica-magnesia gel.

12. In a method of preparing a silica-magnesia catalyst in which a silica-magnesia gel is formed, washed, dried and activated, the improvement comprising the step of reacting a sodium silicate, in which about 45 to 85% of the $Na_2O$ is neutralized, with a colloidal magnesium oxychloride to form the gel.

13. In a method of preparing a silica-magnesia catalyst in which a silica-magnesia gel is formed, washed, dried and activated, the improvement comprising the step of reacting a sodium silicate, in which about 45 to 85% of the $Na_2O$ is neutralized, with a colloidal magnesium oxysulphate to form the gel.

14. In a method of preparing a silica-magnesia catalyst by reacting a gelatinous magnesium oxy-salt with a sodium silicate, and washing, drying and activating the resulting gel, the improvement comprising mixing magnesium oxide with a soluble magnesium compound to form a complex magnesium oxycompound, aging the reaction product and adding water thereto to control the swelling of the reaction product and degree of hydration thereof.

15. A method of manufacturing a silica-magnesia catalyst comprising mixing magnesium oxide with a concentrated solution of magnesium chloride to form a colloidal magnesium oxychloride, slowly adding water to the colloidal magnesium oxychloride while stirring to form a slurry of a magnesium oxychloride, mixing the slurry with a silica hydrogel containing dispersed thereon unneutralized sodium silicate to form a slurry of silica-magnesia gel, washing the gel to remove sodium therefrom, and drying and activating the substantially sodium free gel.

16. A method of manufacturing a silica-magnesia catalyst comprising mixing magnesium oxide with a concentrated magnesium chloride solution having a specific gravity above 1.16 to form a colloidal magnesium oxychloride, slowly adding water to the colloidal magnesium oxychloride while stirring to form a slurry of a magnesium oxychloride gel, mixing the slurry with a silica hydrogel containing dispersed thereon unneutralized sodium silicate to form a slurry of a silica-magnesia gel, washing the gel to remove sodium therefrom, and drying and activating the substantially sodium free gel.

17. A process for the preparation of a silica-magnesia catalyst comprising reacting a colloidal magnesium oxychloride with a silica hydrogel containing dispersed thereon unneutralized sodium silicate to form a silica-magnesia gel, passing the gel in contact with an excess of a magnesium chloride solution to remove zeolitically held sodium by base exchange, drying and activating the gel, and reacting the magnesium chloride effluent from the base exchange reaction with magnesia in the preparation of the magnesium oxychloride whereby losses of magnesium are minimized and a wide flexibility in the concentration and amount of washing magnesium chloride solutions may be employed to leach the gel and control the pore structure of the final catalyst.

18. A process for the preparation of a silica-magnesia catalyst comprising mixing magnesia with a soluble magnesium salt to form a colloidal magnesium oxy-salt, allowing the magnesium oxy-salt to set to a homogeneous hydrogel, reacting the gelatinous magnesium oxy-gel with a sodium silicate dispersed on a silica hydrogel, and washing, drying, and activating the reaction product to form a gel.

19. A method of preparing a silica-magnesia catalyst comprising admixing a colloidal magnesium oxy-salt with a composition selected from the group consisting of a sodium silicate and colloidal silicic acid to form a silica-magnesia gel, washing and drying the product and activating the washed gel.

20. In a method of preparing a silica-magnesia catalyst in which a silica-magnesia catalyst is formed, washed, dried and activated, the improvement comprising the step of admixing a composition selected from the group consisting of a sodium silicate and a colloidal silicic acid with a colloidal magnesium oxy-salt to form a silica-magnesia gel.

21. A method of preparing a silica-magnesia catalyst comprising admixing a colloidal magnesium oxy-salt with a sodium silicate, said sodium silicate being dispersed in a colloidal silicic acid, to form a silica-magnesia gel and washing, drying and activating the gel.

References Cited in the file of this patent

UNITED STATES PATENTS

| Number | Name | Date |
|---|---|---|
| 1,577,186 | Patrick | Mar. 16, 1926 |
| 2,271,319 | Thomas | Jan. 27, 1942 |
| 2,323,728 | Ruthruff | July 6, 1943 |
| 2,467,407 | Ruthruff | Apr. 19, 1949 |
| 2,498,353 | Bierce | Feb. 21, 1950 |
| 2,546,971 | Byrns | Apr. 3, 1951 |
| 2,565,627 | Pryor | Aug. 8, 1951 |